US011210946B2

(12) United States Patent
Adkar et al.

(10) Patent No.: US 11,210,946 B2
(45) Date of Patent: Dec. 28, 2021

(54) CONTENT SHARING BETWEEN VEHICLES BASED ON A PEER-TO-PEER CONNECTION

(71) Applicant: Verizon Patent and Licensing Inc., Arlington, VA (US)

(72) Inventors: Ketan Shridhar Adkar, Alpharetta, GA (US); Charles Forbes Stickels, Milton, GA (US); Joseph Richard Cantrell, Atlanta, GA (US); Thomas George Ancheriyil, Sandy Springs, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 255 days.

(21) Appl. No.: 16/512,083

(22) Filed: Jul. 15, 2019

(65) Prior Publication Data

US 2021/0020044 A1    Jan. 21, 2021

(51) Int. Cl.
| | |
|---|---|
| *G08G 1/01* | (2006.01) |
| *G08G 1/0967* | (2006.01) |
| *G07C 5/00* | (2006.01) |
| *G06K 9/00* | (2006.01) |
| *H04W 4/46* | (2018.01) |

(52) U.S. Cl.
CPC ... *G08G 1/096791* (2013.01); *G06K 9/00791* (2013.01); *G07C 5/008* (2013.01); *G08G 1/09675* (2013.01); *H04W 4/46* (2018.02)

(58) Field of Classification Search
CPC ........ G08G 1/096791; G08G 1/09675; H04W 4/46; G06K 9/00791; G07C 5/008

USPC .......................................... 701/117
See application file for complete search history.

(56) References Cited

U.S. PATENT DOCUMENTS

| | | | |
|---|---|---|---|
| 10,429,504 B2 * | 10/2019 | Choi ....................... G01S 7/003 |
| 11,004,280 B1 * | 5/2021 | Hayward ............... G06Q 40/08 |
| 2001/0028393 A1 * | 10/2001 | Tomida ..................... B60R 1/00 348/207.99 |
| 2004/0101166 A1 * | 5/2004 | Williams ................. G01P 3/38 382/104 |
| 2005/0216144 A1 * | 9/2005 | Baldassa ................ G07C 5/008 701/24 |
| 2007/0262882 A1 * | 11/2007 | Yamamoto ........... B60Q 1/1423 340/933 |
| 2010/0079267 A1 * | 4/2010 | Lin ........................ B60Q 9/008 340/435 |
| 2010/0164789 A1 * | 7/2010 | Basnayake ............. G01S 19/43 342/357.23 |
| 2014/0012494 A1 * | 1/2014 | Cudak ................ G01C 21/3415 701/412 |

(Continued)

*Primary Examiner* — Kerri L McNally
*Assistant Examiner* — Thang D Tran

(57) ABSTRACT

One or more devices associated with a first vehicle receives location information that specifies a location of a second vehicle. The one or more devices determine, based on the location information, that the second vehicle is within a threshold distance of the first vehicle. The one or more devices establish, based on determining that the second vehicle is within the threshold distance of the first vehicle, a peer-to-peer (P2P) connection with the second vehicle. The one or more devices receive from the second vehicle, and by using the P2P connection, content that has been captured by a camera component associated with the second vehicle. The one or more devices cause an interface associated with the first vehicle to display the content.

20 Claims, 7 Drawing Sheets

(56) References Cited

U.S. PATENT DOCUMENTS

| | | | |
|---|---|---|---|
| 2014/0022108 A1* | 1/2014 | Alberth, Jr. | G01S 13/931 342/52 |
| 2014/0222278 A1* | 8/2014 | Fujita | B60W 30/09 701/25 |
| 2015/0294571 A1* | 10/2015 | Shida | G08G 1/161 701/409 |
| 2017/0053534 A1* | 2/2017 | Lokesh | H04L 67/12 |
| 2017/0076606 A1* | 3/2017 | Gupta | B60Q 9/008 |
| 2017/0160748 A1* | 6/2017 | Nakagawaa | G05D 1/00 |
| 2017/0184726 A1* | 6/2017 | Lee | G01S 19/51 |
| 2017/0316254 A1* | 11/2017 | Hariri | G06K 9/00255 |
| 2017/0334500 A1* | 11/2017 | Jarek | G06F 3/16 |
| 2017/0341647 A1* | 11/2017 | Rajvanshi | B60W 30/12 |
| 2017/0369055 A1* | 12/2017 | Saigusa | G08G 1/0116 |
| 2017/0369062 A1* | 12/2017 | Saigusa | B60W 30/16 |
| 2018/0096601 A1* | 4/2018 | Chow | G08G 1/166 |
| 2018/0101736 A1* | 4/2018 | Han | G08G 1/166 |
| 2018/0144549 A1* | 5/2018 | Gonzalez | G02B 27/0172 |
| 2018/0174485 A1* | 6/2018 | Stankoulov | G09B 19/167 |
| 2018/0178786 A1* | 6/2018 | Takaki | B60W 30/09 |
| 2019/0088142 A1* | 3/2019 | Kotteri | G08G 1/22 |
| 2019/0154842 A1* | 5/2019 | Adachi | G01C 21/165 |
| 2019/0164430 A1* | 5/2019 | Nix | G08G 1/163 |
| 2019/0241194 A1* | 8/2019 | Fukasawa | H04W 4/023 |
| 2019/0287080 A1* | 9/2019 | Penilla | G07C 5/0808 |
| 2019/0297475 A1* | 9/2019 | Hatayama | H04B 1/3822 |
| 2019/0342859 A1* | 11/2019 | Rubin | G08G 1/096791 |
| 2019/0370569 A1* | 12/2019 | Gulati | G06K 9/00791 |
| 2020/0005635 A1* | 1/2020 | Nagata | H04N 1/32 |
| 2020/0074735 A1* | 3/2020 | Nowakowski | B60R 1/00 |
| 2020/0086871 A1* | 3/2020 | Gotoda | B60W 30/18 |
| 2020/0164799 A1* | 5/2020 | Nowakowski | B60R 1/00 |
| 2020/0228950 A1* | 7/2020 | Clark | H04W 4/46 |
| 2020/0247412 A1* | 8/2020 | Wang | H04W 4/023 |
| 2020/0255002 A1* | 8/2020 | Chen | G08G 1/166 |
| 2020/0302421 A1* | 9/2020 | Stickels | G06Q 20/401 |

\* cited by examiner

CONTENT SHARING BETWEEN VEHICLES BASED ON A PEER-TO-PEER CONNECTION

BACKGROUND

Vehicle-to-everything (V2X) communication involves passing information from a vehicle to any entity that may affect the vehicle. V2X communication may include wireless local area network (WLAN)-based communication (e.g., dedicated short-range communications (DSRC)), personal area network (PAN)-based communication, and/or the like.

DETAILED DESCRIPTION OF PREFERRED EMBODIMENTS

Figure 1A:
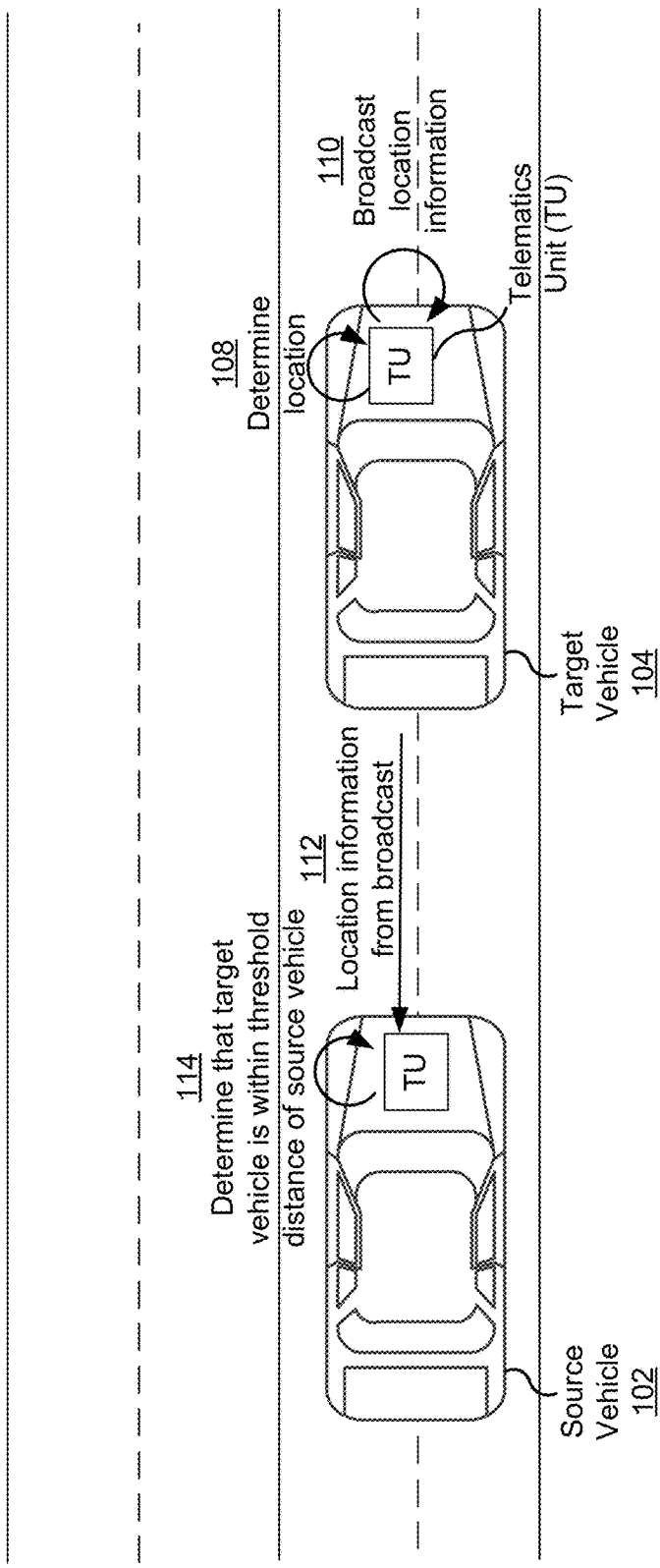
FIGS. 1A-1D are diagrams of one or more example implementations described herein.

The following detailed description of example implementations refers to the accompanying drawings. The same reference numbers in different drawings may identify the same or similar elements.

Cellular-based V2X communication (C-V2X) may permit vehicles to communicate with each other on the road. C-V2X may operate in two modes: a device-to-device mode, and a device-to-network mode. The device-to-device mode may permit a vehicle to communicate with another vehicle, to communicate with another device (e.g., a mobile device of a user, a device associated with a roadway infrastructure, and/or the like), and/or the like. Additionally, while the device-to-network mode may rely on a cellular network to communicate, the device-to-device mode may allow devices to communicate directly, without the use the cellular network.

In some situations, a driver of a vehicle may encounter unexpected objects and/or events while driving down a road. For example, the driver may, while driving down the road, encounter an object on the road and/or the shoulder of the road, a dangerous turn, a traffic jam, a situation where the driver may want to change lanes but lacks clear visibility of the road ahead, and/or the like. These situations may cause the driver to react in a manner that results in unnecessary wear and tear on the vehicle.

To provide a specific example, a first vehicle that is driving down a road, such as a one lane road, may want to pass a second vehicle that is driving at a slower speed in the same lane. If the neighboring lane is for oncoming traffic, and the second vehicle is obstructing the view of a driver of the first vehicle, the driver may have to veer slightly into the neighboring lane to see whether the neighboring lane is capable of being used to pass the second vehicle. This may cause unnecessary wear and tear on the first vehicle. For example, the first vehicle may veer into the neighboring lane and may begin to accelerate to pass the second vehicle, only to have to slow down and fall back to the first vehicle's original position after determining that oncoming traffic is approaching in the neighboring lane. This puts unnecessary strain on brakes of the first vehicle, wastes fuel resources, creates an unsafe situation for the driver who is putting himself or herself at risk while veering slightly into the neighboring lane, and/or the like.

Some implementations described herein provide for one or more devices associated with a first vehicle to establish a peer-to-peer (P2P) connection with a second vehicle to permit content captured by a camera component associated with the second vehicle to be displayed via an interface within the first vehicle. For example, one or more devices associated with the first vehicle (e.g., a telematics unit within the first vehicle, a user equipment (UE) within the first vehicle, and/or the like) may receive location information that specifies a location of the second vehicle. In this case, the one or more devices may determine, based on video data and/or lidar data, that the second vehicle is within a threshold distance of the first vehicle. This may cause the one or more devices to establish the P2P connection with the second vehicle. Additionally, the one or more devices may receive, from one or more other devices associated with the second vehicle and by using the P2P connection, content that has been captured by a camera component associated with the second vehicle. In this case, the one or more devices (e.g., associated with the first vehicle) may cause the content to be displayed via an interface associated with the first vehicle.

In this way, the one or more devices allow the content captured by the camera component associated with the second vehicle to be displayed via the interface associated with the first vehicle. By causing the content to be displayed via the interface, a driver of the first vehicle can view objects present on the road ahead, events that are occurring ahead on the road, and/or the like. This allows the driver to reduce wear and tear of the first vehicle, conserve vehicle resources (e.g., fuel resources, and/or the like), and/or the like. For example, by viewing the objects and/or events via the interface, the driver is able to efficiently and/or effectively operate the first vehicle (e.g., relative to not having knowledge of the content displayed via the interface). This improves safety of passengers in the first vehicle, the second vehicle, and/or any other vehicles that are on the road in a vicinity of the first and second vehicle.

FIGS. 1A-1D are diagrams of one or more example implementations 100 described herein. Example implementation(s) 100 may include a source vehicle (shown as source vehicle 102) and a target vehicle (shown as target vehicle 104) that are driving in a lane on a road and another vehicle driving in a neighboring lane (shown as oncoming traffic vehicle 106). As shown in FIGS. 1A-1D, the source vehicle may determine that the target vehicle is within a threshold distance of the source vehicle and may establish a peer-to-peer (P2P) connection with the target vehicle to allow a camera component associated with the target vehicle to provide content for display on an interface within the source vehicle (e.g., video content depicting a road ahead of the target vehicle). This may alert a driver of the source vehicle that the other vehicle (e.g., oncoming traffic vehicle 106) is driving in the neighboring lane and that the driver should wait until the other vehicle passes before using the neighboring lane to pass the target vehicle.

One or more implementations described below may be described as being performed by the source vehicle. In practice, any implementation described as being performed by the source vehicle may be performed by the target vehicle. Additionally, or alternatively, one or more implementations described below may be described as being performed by the target vehicle. In practice, any implementation described as being performed by the target vehicle may be performed by the source vehicle.

As shown in FIG. 1A, and by reference number 108, the target vehicle may determine a location of the target vehicle in the lane on the road. For example, the target vehicle may be configured with a telematics unit that is able to determine a location of the target vehicle in the lane on the road (e.g., at a given time).

The telematics unit may support location tracking technology (e.g., real-time kinematic (RTK) location tracking technology and/or another type of location tracking technology), vehicle-to-everything (V2X) technology (e.g., cellular V2X (C-V2X) and/or a similar type of technology), and/or the like. The RTK location tracking technology may be used to determine an RTK location of a vehicle (e.g., the target vehicle, the source vehicle, and/or the like). In some cases, the C-V2X technology may allow a vehicle (e.g., the target vehicle, the source vehicle, and/or the like) to communicate with one or more other vehicles on the road, without having to connect to a core network of a service provider (e.g., by interacting with a base station, a mobility management entity (MME), and/or the like). Additional information regarding the RTK location tracking technology and the C-V2X technology is provided below.

In some implementations, the target vehicle may determine an RTK location. For example, the target vehicle (e.g., using the RTK location tracking technology of the telematics unit) may determine an RTK location of the target vehicle while driving in the lane down the road. The RTK location may be defined by one or more sets of geographic coordinates that identify a location of the target vehicle at a given time. For example, the RTK location may define a specific point within the target vehicle (e.g., using a set of geographic coordinates), may define a boundary of a device within the target vehicle (e.g., using sets of geographic coordinates to define a boundary of the telematics unit and/or another device within the target vehicle), may define a boundary of the target vehicle (e.g., using sets of geographic coordinates that correspond to dimensions of the target vehicle), and/or the like.

In some cases, the target vehicle may determine the RTK location based on an RTK location of a device associated with the target vehicle (e.g., the telematics unit, and/or the like) and based on vehicle dimensions of the target vehicle. For example, the telematics unit of the target vehicle may determine an RTK location of the telematics unit. In this case, the telematics unit may be configured with and/or have access to a data structure that stores vehicle information for the target vehicle. The vehicle information may include information identifying the vehicle dimensions. This may allow the telematics unit to use the information identifying the vehicle dimensions to determine the RTK location of the target vehicle. For example, in a case where the front of the target vehicle is W feet ahead of the telematics unit (e.g., in a first direction), the back of the target vehicle is X feet behind the telematics unit (e.g., in a second direction), a first side of the target vehicle is Y feet away from the telematics unit (e.g., in a third direction), and a second side of the target vehicle is Z feet away from the telematics unit (e.g., in a fourth direction), the telematics unit may use the dimensions of the vehicle relative to the RTK location of the telematics unit to determine the RTK location of the target vehicle.

Additionally, or alternatively, another device associated with the target vehicle may determine the RTK location of the target vehicle. For example, a user equipment (UE), such as a mobile device or another device within the target vehicle, may use the location tracking technology (e.g., the RTK location tracking technology) described herein to determine a particular RTK location of the UE, which may be used to determine the RTK location of the target vehicle (e.g., in a manner described above).

As shown by reference number 110, the target vehicle may broadcast location information. For example, the target vehicle may broadcast location information that identifies the location of the target device. In some implementations, the target vehicle may broadcast the location information to one or more vehicles (and/or devices) within a broadcast range of the target vehicle. The broadcast range may be a set geographic area, a radius around the target vehicle, and/or the like. In some cases, the broadcast range may correspond to a P2P connection range that permits vehicles to establish a P2P connection, as described further herein. The target vehicle may broadcast the location information periodically (e.g., while the target vehicle is in route to a destination), at configured time intervals, and/or the like.

In some implementations, the target vehicle may use the telematics unit to broadcast the location information. For example, the telematics unit may be configured with C-V2X technology and the target vehicle may use the C-V2X technology to broadcast the location information. The C-V2X technology may allow messages to be sent and/or received between vehicles and/or devices using a direct connection interface (e.g., a ProSe Sidelink (PC5) interface) that does not require communication with one or more devices of a core network. The direct connection interface may be compatible with and/or defined by standards associated with a fourth generation (4G) network, compatible with and/or defined by standards associated with a fifth generation (5G) network, and/or the like. In the example shown, the target vehicle may broadcast the location information in a broadcast range that includes the source vehicle.

Additionally, or alternatively, the UE may broadcast the location information. For example, the UE may be configured with the C-V2X technology and may use the C-V2X technology to broadcast the location information (e.g., instead of the telematics unit of the target vehicle, in addition to the telematics unit, and/or the like).

As shown by reference number 112, the source vehicle may receive the location information that identifies the location of the target vehicle. For example, the source vehicle (e.g., a telematics unit of the source vehicle, the UE within the source vehicle, and/or the like) may receive the location information based on being within the broadcast range of the target device.

As shown by reference number 114, the source vehicle may determine that the target vehicle is within a threshold distance of the source vehicle. For example, the P2P connection between the source vehicle and the target vehicle may only need to be established if the target vehicle is within a threshold distance of the source vehicle. In this case, the source vehicle (e.g., the telematics unit and/or another device associated with the source vehicle) may be configured with a value that identifies a threshold distance. The threshold distance may define an area around at least a portion of the source vehicle and may be an area in front of the source vehicle (e.g., five feet, ten feet, and/or the like), an area to a side of the source vehicle, an area behind the source vehicle, an area defined by the driver and/or another user, and/or the like. In some implementations, the threshold distance may be the area in front of the source vehicle and may be used as an indicator that the target vehicle is in front of the source vehicle, may be used as an indicator that the target vehicle is close enough to the source vehicle to obstruct a view of a driver of the source vehicle, and/or the like.

In some implementations, the source vehicle may use the telematics unit to determine that the target vehicle is within the threshold distance of the source vehicle. For example, the source vehicle may use the telematics unit to determine a location (e.g., an RTK location, and/or the like) of the source vehicle. The location may be determined in a manner consistent with that described in connection with determining the location of the target vehicle. In this case, the source vehicle may determine a difference between the location of the target vehicle and the location of the source vehicle. This may allow the source vehicle to compare the difference and the threshold distance to determine that the target vehicle is within the threshold distance of the source vehicle.

In some implementations, the source vehicle may use a verified location to determine that the target vehicle is within the threshold distance of the source vehicle. For example, in some cases, the source vehicle may receive location information from multiple nearby vehicles. In these cases, the source vehicle may be configured to perform one or more actions (described below) to verify a location of a target vehicle, of the nearby vehicles, and to use the verified location to determine whether the target vehicle is within the threshold distance of the source vehicle.

As an example, the source vehicle may receive location information from multiple nearby vehicles. In this example, the source vehicle may use the telematics unit to determine a location (e.g., an RTK location, and/or the like) of the source vehicle and may determine an estimated location of a first vehicle, of the multiple nearby vehicles, where the first vehicle is located ahead of the source vehicle. The source vehicle may determine the estimated location of the first vehicle based on the determined location of the source vehicle. For example, the source vehicle may determine the estimated location using a camera associated with the source vehicle (e.g., which captures image data and/or video data that depicts the first vehicle driving on the road ahead of the source vehicle), using a lidar technique (e.g., which measures reflected light obtained by a sensor), and/or the like. Furthermore, the source vehicle may verify the location of the first vehicle by comparing the estimated location and the location identified in the broadcasted location information. This may allow the source vehicle to use the verified location to determine that the first vehicle is within the threshold distance of the source vehicle (e.g., therefore the first vehicle may be said to be the target vehicle).

In this way, the source vehicle identifies the target vehicle, as further described below.

Figure 1B:
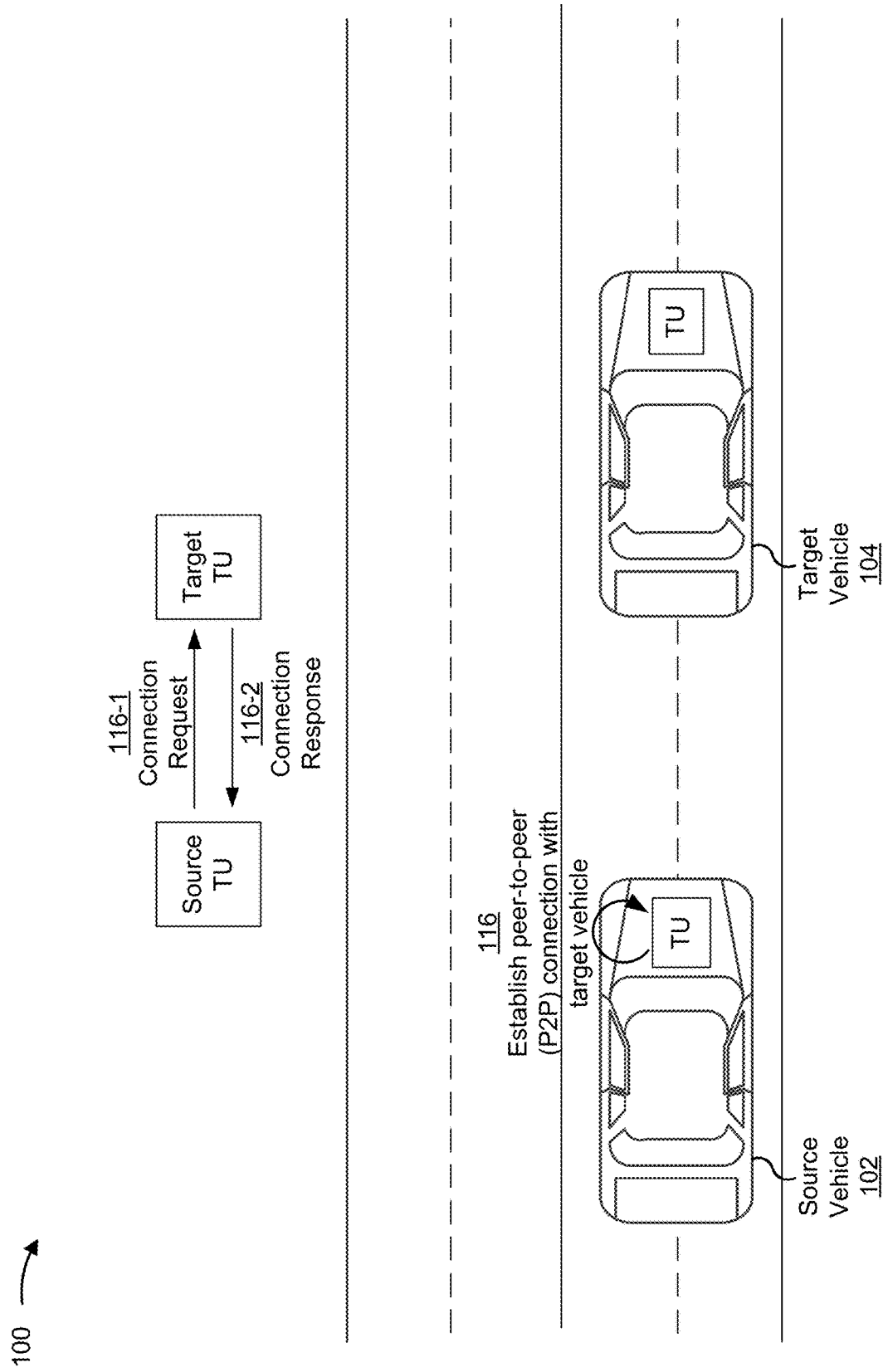

As shown in FIG. 1B, and by reference number 116, the source vehicle may establish a P2P connection with the target vehicle. For example, the source vehicle may establish a P2P connection with the target vehicle based on determining that the target vehicle is in front of and/or is within the threshold distance of the source vehicle.

The P2P connection between the source vehicle and the target vehicle may be a V2X connection (e.g., a C-V2X connection, and/or the like), a wireless personal area network (WPAN) connection (e.g., a Bluetooth connection, a near field communication (NFC) connection, and/or the like), and/or the like. The P2P connection may be between the telematics unit of the source vehicle and the telematics unit of the target vehicle, between a UE within the source vehicle and the telematics unit of the target vehicle, between the telematics unit of the source vehicle and a UE within the target vehicle, between a UE within the source vehicle and a UE within the target vehicle, and/or between any other devices and/or components associated with the source vehicle and/or the target vehicle. The P2P connection may be made via a direct connection interface, such as a PC5 interface, an interface used for a WPAN connection, and/or the like.

In some implementations, before establishing the P2P connection, the target vehicle may be configured with one or more tools (e.g., a hardware component, a software element, and/or the like) that allow the target vehicle to share content with other vehicles (e.g., the source vehicle). The one or more tools may include a camera component, a telematics unit, a diagnostic and tracking system, an infotainment system, a global positioning system (GPS), a tool that supports real-time kinematic (RTK) location tracking technology, a tool that supports vehicle-to-everything (V2X) technology, and/or the like. In this case, the one or more tools may be configured in a manner that allow the source vehicle to receive content displayed by a camera component of the target vehicle. For example, the telematics unit may be configured to perform one or more actions to establish the P2P connection based on receiving a request to establish the P2P connection, based on determining that the source vehicle has tools that are compatible with the target vehicle (e.g., based on shared vehicle configuration information, as further described below), and/or the like.

In some cases, before establishing the P2P connection, the source vehicle may identify a vehicle configuration of the target vehicle. For example, the source vehicle may communicate with the target vehicle (e.g., via a request-response communication, via an advertisement message from the target vehicle, via an API or another type of communication interface, and/or the like) to identify the vehicle configuration of the target vehicle. The vehicle configuration may indicate whether the target vehicle has one or more tools (e.g., a hardware component, a software element, and/or the like) that are needed to share content with the source vehicle. For example, the source vehicle may obtain vehicle configuration information that identifies whether the target vehicle has a camera component that is needed to share content, that identifies a type of camera component, that identifies a version of camera component, and/or any other information that may be needed to share the content with the source vehicle. In other cases, the source vehicle may identify the vehicle configuration after establishing the P2P connection (e.g., by using the P2P connection to obtain the vehicle configuration information).

In some implementations, to establish the P2P connection, the source vehicle may have been provided with an identifier associated with the target vehicle (e.g., which may have been broadcast with the location information). For example, the broadcast may have included an identifier of the telematics unit, an identifier of the UE within the target vehicle, and/or the like. The identifier may be an internet protocol (IP) address, a media access control (MAC) address, and/or another type of address or identifier. In some cases, the source vehicle (e.g., using the telematics unit) may use the identifier of the target vehicle as part of a P2P connection request that is provided to the target vehicle (e.g., to the telematics unit of the target vehicle, the UE within the target vehicle, and/or the like). In these cases, the target vehicle may provide the source vehicle with a P2P connection response that indicates that the P2P connection has been accepted and/or established.

As an example, the source vehicle may have been provided with a MAC address of the telematics unit of the target vehicle (e.g., as part of a Bluetooth broadcast). In this example, the source vehicle may provide a P2P connection request 116-1 to the target vehicle, which includes the MAC address as a destination address, which may cause the target vehicle to provide the source vehicle with a P2P connection response 116-2 that indicates that the P2P connection has been established.

In some implementations, as described above, the source vehicle may establish the P2P connection with the target vehicle based on determining that the target vehicle is in front of and/or is within the threshold distance of the source vehicle. Additionally, or alternatively, the source vehicle may establish the P2P connection with the target vehicle based on a user selecting the target vehicle from an in-vehicle interface, based on the target vehicle being within a P2P communication range of the source vehicle, and/or the like. For example, the source vehicle may establish the P2P connection based on receiving a request from a user (e.g., the driver, a passenger, and/or the like). In this case, the user may have registered for an application, such as an application that is part of a vehicle diagnostic and tracking system. The application may permit the user to view a digital roadmap that identifies one or more other vehicles in the area that are able to participate in content sharing activities (e.g., based on having a telematics unit, a UE with access to the application, and/or the like). The user may view the digital roadmap via an interface of the source vehicle, an interface of a UE within the source vehicle, and/or the like. In this case, the user may interact with the interface to select a particular vehicle, of the one or more other vehicles displayed on the digital roadmap. When the driver selects the particular vehicle, vehicle selection data for the particular vehicle may be provided to the telematics unit, which may cause the telematics unit to establish the P2P connection with the particular vehicle.

As an example, a group of vehicles may be traveling on the road ahead of the source vehicle, and a first vehicle, a fourth vehicle, and a fifth vehicle, of the group of vehicles, may have access to content sharing capabilities (e.g., in a manner described herein). In this example, an interface of a dashboard of the source vehicle may display a digital roadmap that indicates that there are three vehicles ahead that are selectable based on having access to content sharing capabilities. Additionally, the driver may interact with the interface of the dashboard to select the fifth vehicle, which may cause vehicle selection data for the fifth vehicle to be provided to the telematics unit of the source vehicle. This may allow the telematics unit to establish the P2P connection with the fifth vehicle.

In some implementations, a chain of P2P connections may be established between three or more vehicles. For example, as described above, a user in the source vehicle may view a digital roadmap indicating that there are a group of vehicles ahead of the source vehicle. In some cases, the user may select a vehicle that is outside of a P2P communication range that would permit the source vehicle to establish a P2P connection. In these cases, the source vehicle may establish a P2P connection with a first vehicle, of the group of vehicles, and the first vehicle may establish a P2P connection with the vehicle that is outside of the P2P communication range of the source vehicle (or with another vehicle that is able to establish the P2P connection with the vehicle).

In other cases, a chain of P2P connections may be established without the user selecting a vehicle that is outside of the P2P communication range of the source vehicle. For example, the source vehicle may establish a P2P connection with a first target vehicle based on determining that the first target vehicle is within the threshold distance of the source vehicle. Additionally, the first target vehicle may establish a P2P connection with a second target vehicle (e.g., which may be ahead of the first target vehicle in the lane). In this case, the two P2P connections may allow the source vehicle to display content depicted by a camera associated with the first target vehicle and/or to display content depicted by a camera associated with the second target vehicle, as further described in connection with FIG. 1C. In this way, a chain of P2P connections may be established that allow an interface within the source vehicle to receive content from vehicles that are outside of the P2P communication range of the source vehicle, as will be further described elsewhere herein.

In some implementations, the target vehicle may establish the P2P connection with the source vehicle. In this case, one or more actions performed by the source vehicle to establish the P2P connection may be performed by the target vehicle (and one or more actions performed by the target vehicle may be performed by the source vehicle).

In this way, the P2P connection is established between the source vehicle and the target vehicle. By establishing the P2P connection directly with the target vehicle, the source vehicle conserves network resources relative to a solution that relies on communicating with one or more network devices (e.g., that are part of a core network) to establish a connection between the source vehicle and the target vehicle.

Figure 1C:
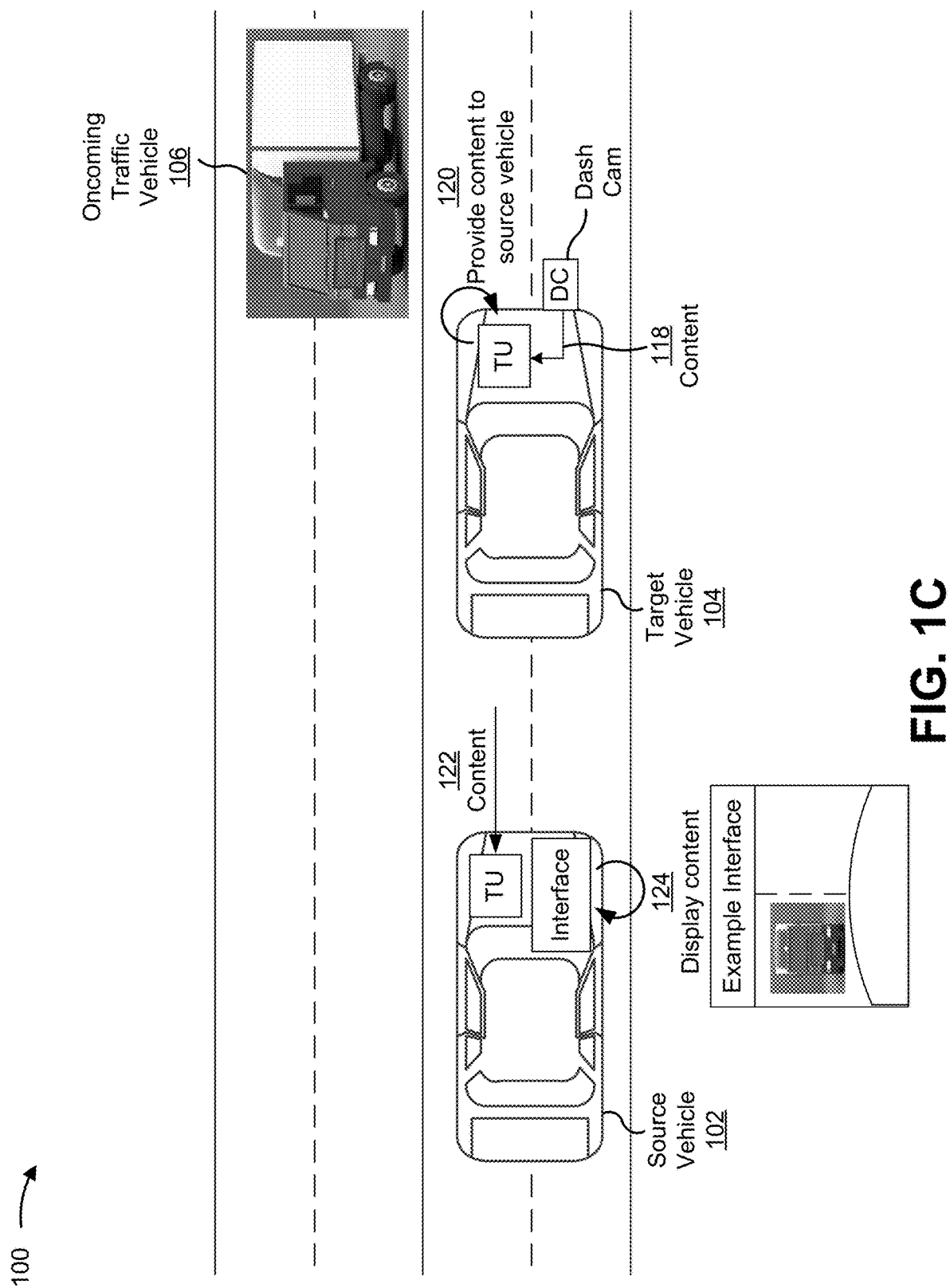

As shown in FIG. 1C, an interface within the first vehicle may display content that is captured by a camera component associated with the target vehicle. For example, and as shown by reference number 118, a camera component associated with the target vehicle may capture content around the target vehicle. The content may include video content and/or image content and may depict the road ahead of the target vehicle, the road to a side of the target vehicle, the road behind the target vehicle, and/or the like. The camera component associated with the target vehicle may include an in-vehicle camera (e.g., a dashboard camera, a camera of a mobile device of the driver, and/or the like), a camera affixed to an outside part of the target vehicle, and/or the like.

In some implementations, the camera component may be configured to capture content based on receiving an indication that the P2P connection has been established. Additionally, or alternatively, the camera component may be configured to capture content while the target vehicle is traveling to a destination, based on a rule configured by a user, and/or the like.

As shown by reference number 120, the target vehicle may provide the content to the source vehicle. For example, the target vehicle (e.g., using the telematics unit, a UE within the target vehicle, and/or the like) may use the P2P connection to provide the content to the telematics unit of the source vehicle, a UE within the target vehicle, and/or the like.

As shown by reference number 122, the source vehicle may display the content. For example, the source vehicle may provide the content for display via an interface within the vehicle, such as via a heads up display (HUD), an in-vehicle dashboard (e.g., which may be part of an infotainment system, a navigation system, and/or the like), a display screen of a UE within the source vehicle, such as a mobile device of the driver or a similar type of device, and/or the like. In the example shown, the source vehicle may display the road ahead of the target vehicle, which may show that another vehicle (shown as oncoming traffic vehicle 106) is traveling in the neighboring lane. This may alert the driver that the neighboring lane is not safe to use to pass the target vehicle.

In some implementations, the source vehicle may automatically display the content via the interface (e.g., automatically based on receiving the content). Additionally, or alternatively, the source vehicle may display the content based on an instruction from a user (e.g., the driver, a passenger, and/or the like). For example, the source vehicle may display the content based on a voice command of the user, based on a user selection of a button or icon displayed on the interface, based on a gesture made by the user, based on a rule configured by a user, and/or the like.

In some implementations, the source vehicle may display content received from multiple vehicles. As an example, as described above, the driver of the source vehicle may select one or more vehicles from a roadmap displayed on the interface. If the driver selects multiple vehicles, the interface may display content from each respective vehicle (e.g., using a split screen display, and/or the like). In this example, if the source vehicle has a P2P connection with two or more vehicles, the source vehicle may receive content directly from each respective vehicle and may display the content via the interface.

Additionally, or alternatively, and provided as another example, if a chain of two or more P2P connections has been established between the source vehicle and the two or more vehicles (e.g., because at least one of the two or more vehicles is outside of the P2P communication range of the source vehicle), then content may be provided to the source vehicle via the chain of two or more P2P connections. As an illustrative example, if the source vehicle has a P2P connection with a second vehicle and the second vehicle has a P2P connection with a third vehicle, then the third vehicle may provide content to the second vehicle, and the second vehicle may provide, to the source vehicle, the content from the third vehicle and additional content captured by the second vehicle. This may allow the source vehicle to display content received from multiple vehicles, even if one or more of the vehicles is outside of the P2P communication range of the source vehicle.

Additionally, or alternatively, the source vehicle may selectively determine which content to display. For example, the source vehicle may be configured with one or more content display rules that may be used to select which content to display in the event that content is received from multiple vehicles. To provide a few examples, the source vehicle may be configured to display content from a vehicle that is furthest ahead of (or closest to) the source vehicle on the road, display content from a vehicle that is furthest from (or closest to) a configured point or distance from the source vehicle, and/or the like.

While one or more implementations described herein describe the interface as displaying content within the first vehicle, it is to be understood that this is provided by way of example. In some cases, the interface may be used to display the content in an area outside of the first vehicle. For example, if the first vehicle is a convertible, a motorcycle (e.g., a motorcycle with a sidecar), and/or another type of vehicle that is not enclosed by a vehicle roof, the interface may be said to display the content in a manner that is visible outside of the first vehicle.

In some implementations, the source vehicle may perform an action based on the content. For example, the source vehicle may be an autonomous vehicle and may analyze the content to determine whether the neighboring lane is safe to use to pass the target vehicle. If, for example, the source vehicle analyzes the content and determines that there are no other vehicles in the neighboring lane, then the source vehicle may automatically pass the target vehicle via the neighboring lane.

As another example, the source vehicle may automatically apply brakes based on a trigger condition being satisfied. For example, the content may illustrate that the other vehicle (e.g., oncoming traffic vehicle 106) is located in a dangerous position on the road. In this case, the source vehicle may be configured with one or more trigger conditions that identify and/or describe situations where vehicles are in dangerous positions on the road and may automatically apply the brakes if a trigger condition is satisfied. As a specific example, if oncoming traffic vehicle 106 is swerving into the same lane as the source vehicle, and the content depicts that oncoming traffic vehicle 106 has crossed into the lane of the source vehicle, the source vehicle may automatically apply brakes, may adjust steering to cause the source vehicle to drive in a part of the lane that is furthest from oncoming traffic vehicle 106, and/or the like.

As another example, the source vehicle may automatically display a warning to the driver based on the content. For example, if the content depicts a hazardous condition (e.g., a pothole, debris in the road, flooding, and/or the like), the source vehicle may process the content (e.g., using an image recognition technique) to identify the hazardous condition and may automatically display a warning based on the identified hazardous condition.

In some cases, the source vehicle may be located in front of the target vehicle. In these cases, the content that the target vehicle may share may depict a back portion of the source vehicle. This may cause the camera component of the source vehicle to display content depicting one or more tail lights of the source vehicle, one or more tires, one or more roof rack items, and/or the like. Furthermore, the source vehicle may perform specific actions based on the content displayed by the target vehicle. For example, the source vehicle may cause an in-vehicle interface to display a warning message indicating that a tail light is out, that tire pressure is low, that a tire alignment is off, that a roof rack item is not securely fastened, and/or the like. As another example, the source vehicle may, based on the content, automatically contact a tow truck service, an insurance provider, and/or the like.

In this way, the source vehicle displays content provided by the target vehicle.

Figure 1D:
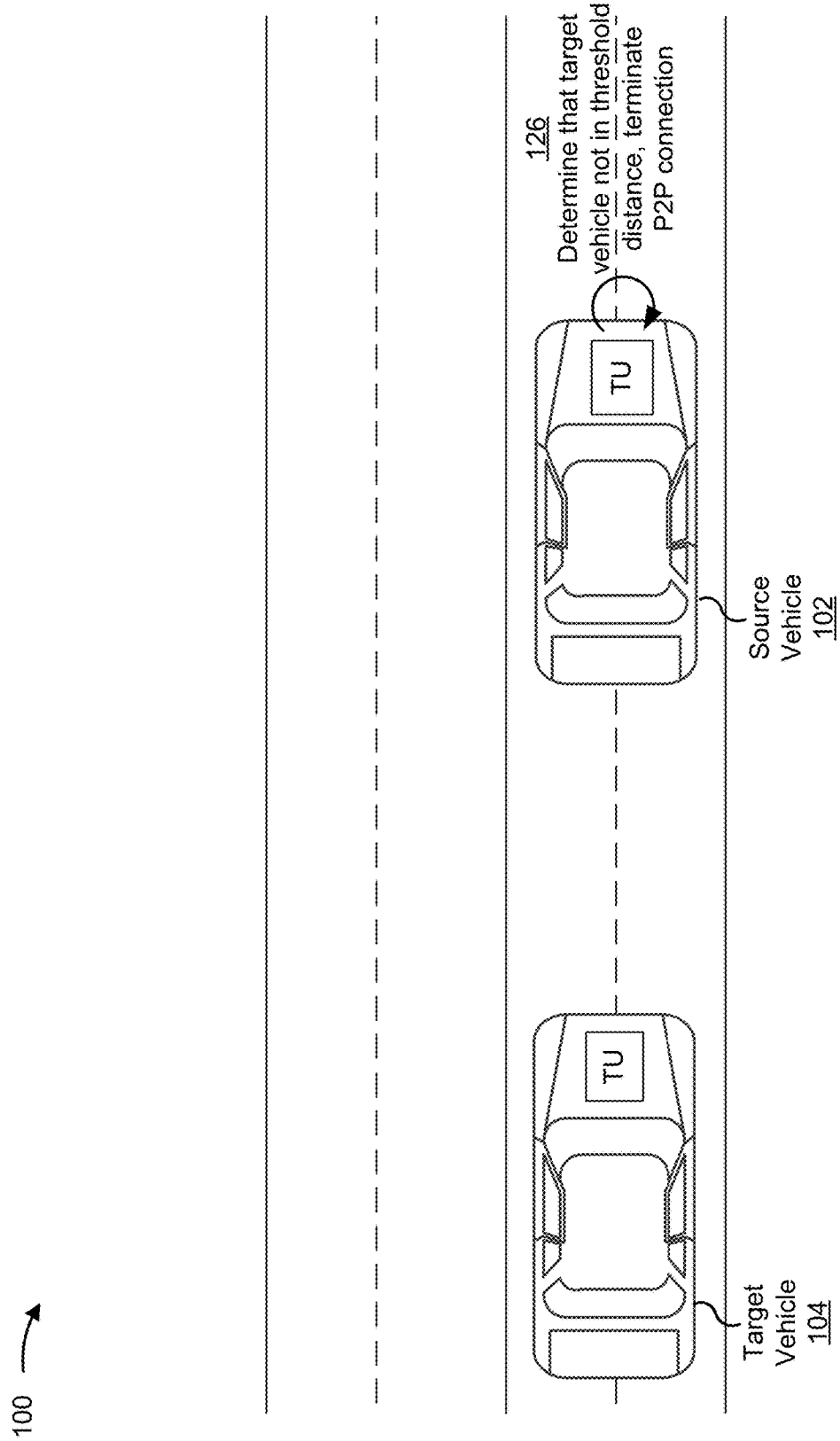

As shown in FIG. 1D, and by reference number 124, the source vehicle may detect that the target vehicle is not within the threshold distance and may terminate the P2P connection 126. For example, the source vehicle may periodically re-determine whether the target vehicle is in front of the source vehicle and/or is within the threshold distance of the source vehicle (in a manner described above) and may terminate the P2P connection with the target vehicle based on determining that the target vehicle is no longer in front of and/or is no longer within the threshold distance. In this case, termination of the P2P connection may cause the target vehicle to stop capturing the content. In some implementations, the target vehicle may terminate the P2P connection (rather than the source vehicle). By terminating the P2P connection based on the target vehicle being outside of the threshold distance of the source vehicle, resources (e.g., processing resources, P2P connection resources, and/or the like) of devices associated with the source vehicle and/or the target vehicle are conserved relative to continuing to display content via the interface in situations where the driver of the source vehicle would not benefit from the content.

By allowing the content captured by the camera component associated with the target vehicle to be displayed via the interface of the source vehicle, the driver of the source vehicle can efficiently and/or effectively operate the source vehicle. This allows the driver to reduce wear and tear of the source vehicle, conserve vehicle resources (e.g., fuel resources, and/or the like), and/or the like.

As indicated above, FIGS. 1A-1D are provided as one or more examples. Other examples can differ from what is described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
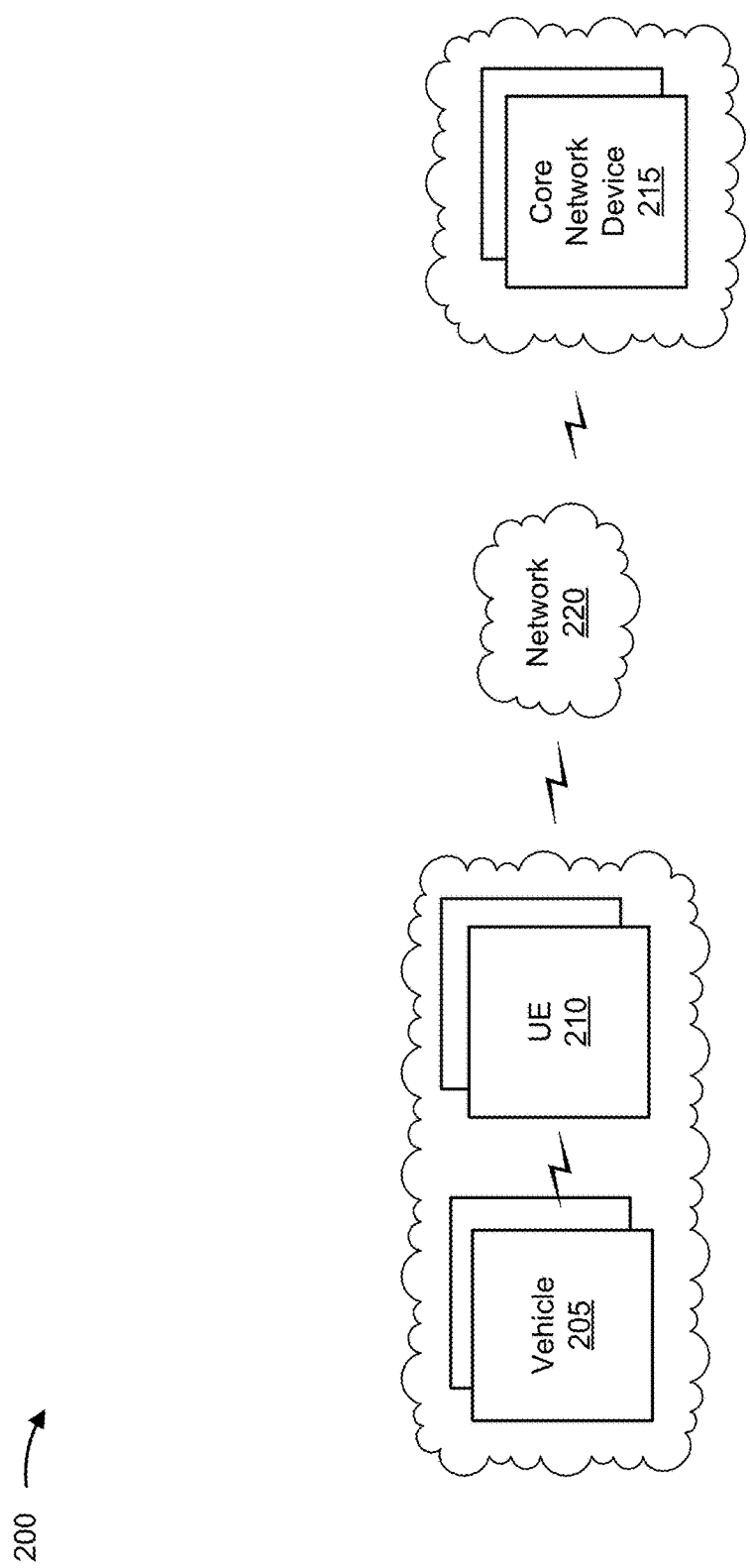
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of vehicles 205, a group of user equipment (UE) 210, a group of core network devices 215, and/or a network 220. Devices of environment 200 may interconnect via wired connections, wireless connections, or a combination of wired and wireless connections.

Vehicle 205 includes one or more devices capable of receiving, generating, storing, processing, and/or providing information, such as information described herein. In some implementations, vehicle 205 may include a telematics unit, a diagnostic and tracking system (e.g., an onboard vehicle diagnostic (OBD) system, which may include one or more OBD ports), an in-vehicle infotainment (IVI) system, an in-car entertainment (ICE) system, a navigation system, such as a Global Positioning System (GPS) (e.g., which may be part of the telematics system, part of the IVI or ICE system, a separate system, and/or the like), a camera device (and/or a device that includes a camera component), and/or a similar type of device, unit, and/or system. In some implementations, the telematics unit may include a radio component, one or more antennas, one or more processors, and/or the like.

In some implementations, vehicle 205 may be configured with a device and/or a component that supports real-time kinematic (RTK) location tracking technology, vehicle-to-everything (V2X) technology (e.g., cellular C-V2X (C-V2X) technology), and/or the like. In some implementations, a first vehicle 205 may broadcast location information to one or more other vehicles 205 that are within a broadcast range of the first vehicle 205. Additionally, or alternatively, a first vehicle 205 may establish a peer-to-peer (P2P) connection with one or more other vehicles 205. In some implementations, one or more interfaces of a first vehicle 205 may be used to display content provided by one or other vehicles 205.

UE 210 includes one or more devices capable of communicating with base station 215 and/or a network (e.g., network 245). For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 210 may be capable of communicating using uplink (e.g., UE to base station) communications, downlink (e.g., base station to UE) communications, and/or side link (e.g., UE-to-UE) communications. In some implementations, UE 210 may include a machine-type communication (MTC) UE, such as an evolved or enhanced MTC (eMTC) UE. In some implementations, UE 210 may include an Internet of Things (IoT) UE, such as a narrowband IoT (NB-IoT) UE and/or the like.

In some implementations, UE 210 may perform one or more actions described herein as being performed by vehicle 205. In some implementations, UE 210 may be a mobile device within vehicle 205 and may broadcast location information in a manner described elsewhere herein, may establish a P2P connection in a manner described elsewhere herein, may display content via an interface of UE 210 in a manner described elsewhere herein, and/or the like.

Core network device 215 includes one or more devices capable of receiving, storing, generating, determining, and/or providing information, such as information described herein. For example, core network device 215 may include devices that are part of a core network. In some implementations, core network device 215 may communicate with vehicle 205 and/or UE 210 to assist in establishing a P2P connection (e.g., a cellular vehicle-to-everything (C-V2X) connection, which may include device-to-device communication, device-to-network communication, and/or the like). Additionally, or alternatively, core network device 215 may communicate with vehicle 205 and/or UE 210 to assist in routing data associated with an application and/or a service.

In some implementations, core network device 215 may include devices that are part of an evolved packet system (EPS) that includes an LTE network and/or an evolved packet core (EPC) that operate based on a third-generation partnership project (3GPP) wireless communication standard. The LTE network may include a radio access network (RAN) that includes one or more base stations that take the form of evolved Node Bs (eNBs) via which vehicle 205 and/or UE 210 communicates with the EPC. The EPC may include a mobility management entity (MME), a serving gateway (SGW), and/or a packet data network gateway (PGW), that enable UE 210 to communicate with network 220 and/or an Internet protocol (IP) multimedia subsystem (IMS) core. The IMS core may include a home subscriber server (HSS) and/or an authentication, authorization, and accounting server (AAA), and may manage device registration and authentication, session initiation, etc., associated with vehicle 205 and/or UE 210. The HSS and/or the AAA may reside in the EPC and/or the IMS core.

In some implementations, core network device 215 may include one or more devices that are part of another type of network. For example, core network device 215 may include one or more devices that are part of a 5G NG core network included in a 5G wireless telecommunications system.

Network 220 includes one or more wired and/or wireless networks. For example, network 220 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
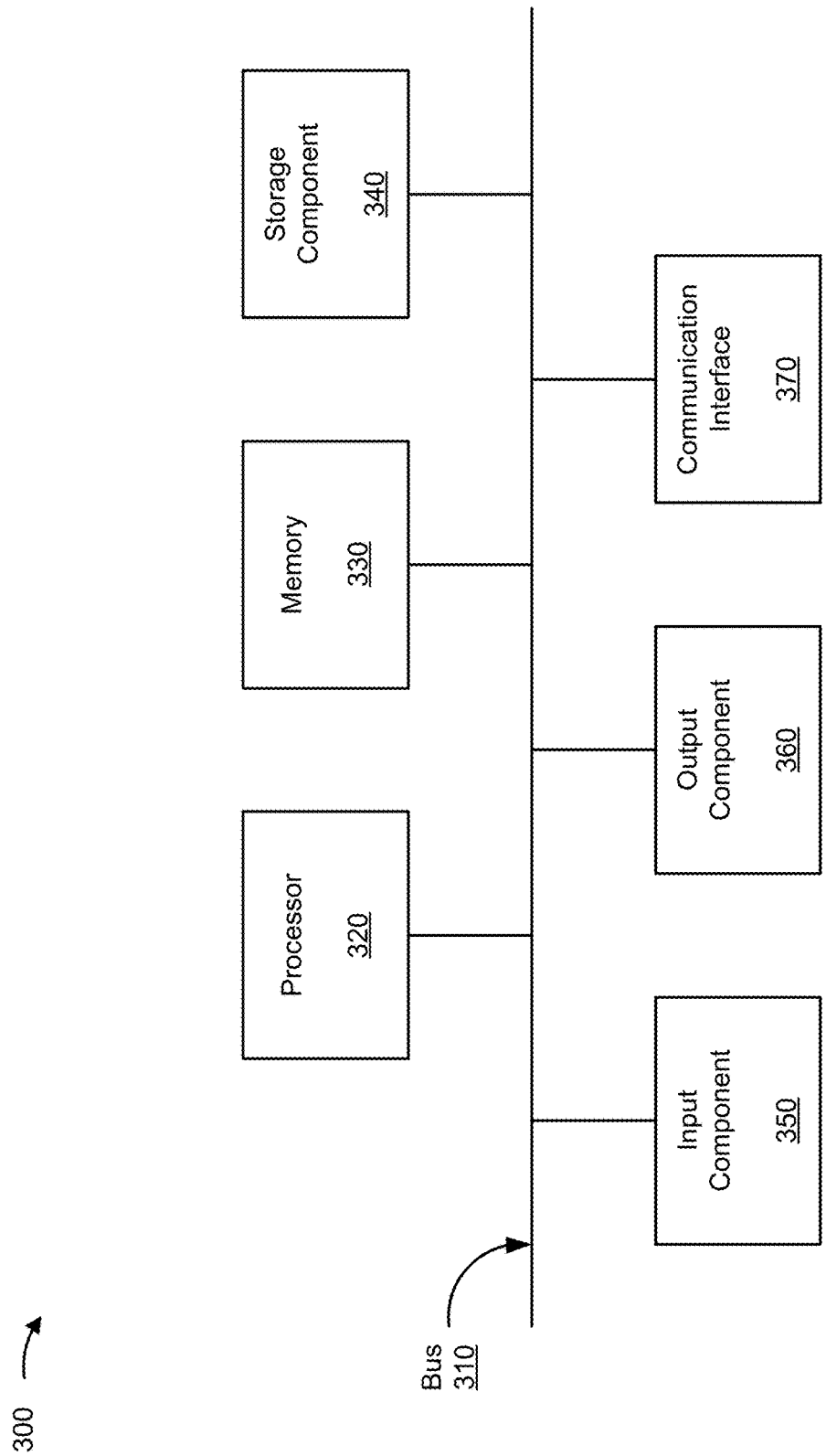
FIG. 3 is a diagram of example components of one or more devices of FIG. 2.

FIG. 3 is a diagram of example components of a device 300. In some implementations, device 300 may correspond to vehicle 205, UE 210, and/or core network device 215. In some implementations, vehicle 205, UE 210, and/or core network device 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
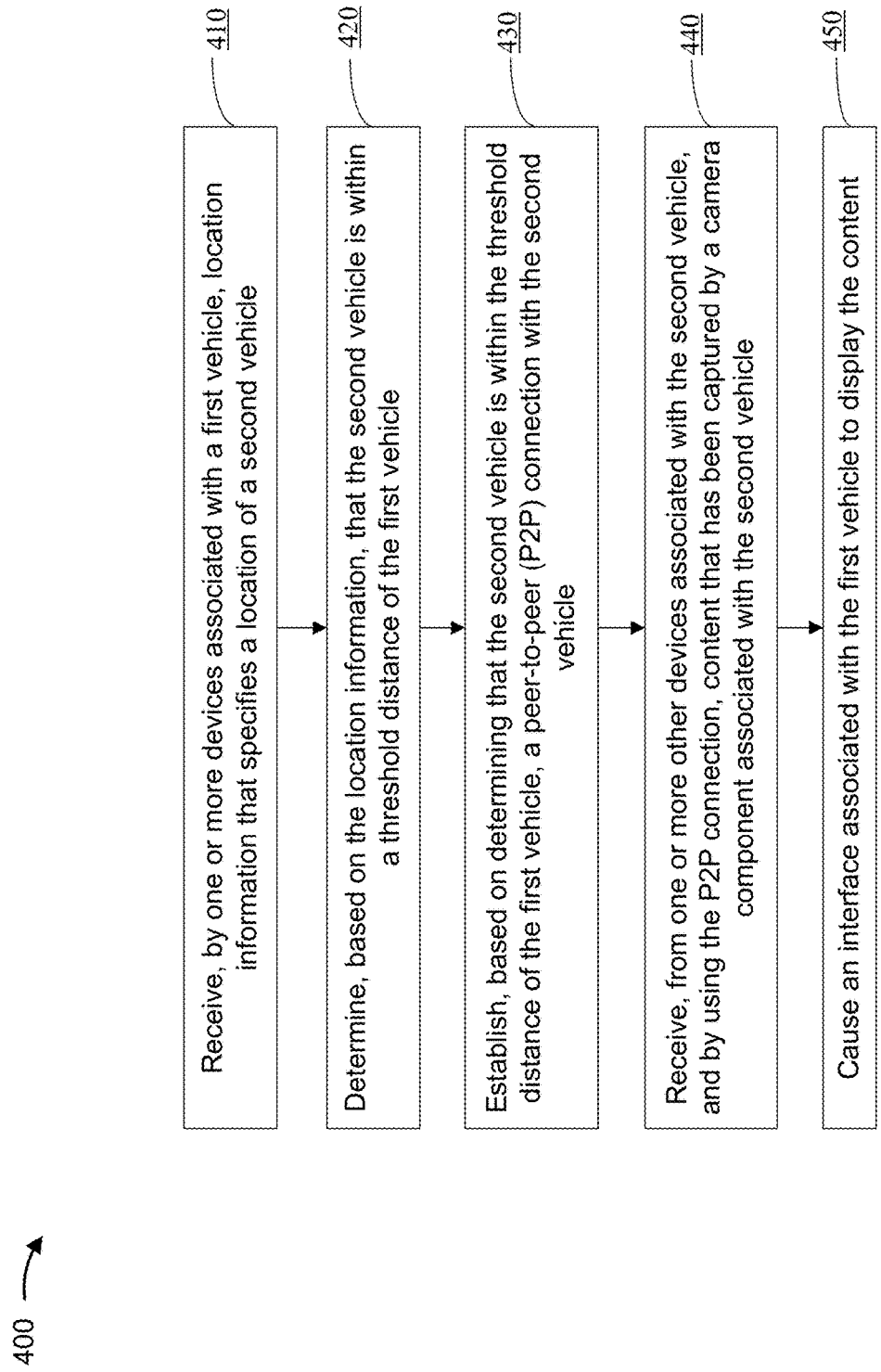
FIG. 4 is a flowchart of an example process for displaying, on an interface within a first vehicle, content captured by a camera component associated with a second vehicle.

FIG. 4 is a flow chart of an example process 400 for displaying, on an interface within a first vehicle, content captured by a camera component associated with a second vehicle. In some implementations, one or more process blocks of FIG. 4 may be performed by a vehicle (e.g., vehicle 205). In some implementations, one or more process blocks of FIG. 4 may be performed by another device or a group of devices separate from or including the vehicle, such as a user equipment (UE) (e.g., UE 210), a core network device (e.g., core network device 215), and/or the like.

As shown in FIG. 4, process 400 may include receiving, by one or more devices associated with a first vehicle, location information that specifies a location of a second vehicle (block 410). For example, one or more devices associated with a first vehicle (e.g., a telematics unit of the first vehicle, a UE within the first vehicle, and/or the like) may receive location information that specifies a location of a second vehicle, as described above.

In some implementations, when receiving the location information that specifies the location of the second vehicle, the first vehicle may receive additional location information that specifies one or more locations of one or more other vehicles. For example, the first vehicle may receive additional location information from one or more telematics units of the one or more other vehicles, one or more UEs within the one or more other vehicles, and/or the like.

In some implementations, the first vehicle may receive the location information as part of a broadcast from a particular device associated with the second vehicle (e.g., a telematics unit of the second vehicle, a UE within the second vehicle, and/or the like). In some implementations, the broadcast may also provide the first vehicle with an identifier of the second vehicle (e.g., an internet protocol (IP) address, a media access control (MAC) address, and/or the like). This may allow the first vehicle to use the identifier of the second vehicle when establishing the P2P connection, as further described below.

As further shown in FIG. 4, process 400 may include determining, based on the location information, that the second vehicle is within a threshold distance of the first vehicle (block 420). For example, the one or more devices associated with the first vehicle (e.g., the telematics unit of the first vehicle, the UE within the first vehicle, and/or the like) may determine, based on the location information, that the second vehicle is within a threshold distance of the first vehicle, as described above. In some implementations, the first vehicle may determine that the second vehicle is within the threshold distance of the first vehicle using the telematics unit that is configured with real-time kinetic (RTK) location tracking technology.

In some implementations, the location of the second vehicle may be a first RTK location. In some implementations, to determine that the second vehicle is within the threshold distance of the first vehicle, the first vehicle may determine a second RTK location for the first vehicle. Additionally, the first vehicle may compare a difference between the first RTK location and the second RTK location with the threshold distance. Furthermore, the first vehicle may determine that the second vehicle is within the threshold distance of the first vehicle based on comparing the difference between the first RTK location and the second RTK location with the threshold distance.

In some implementations, to determine that the second vehicle is within the threshold distance of the first vehicle, the first vehicle may determine a particular location of the first vehicle. Additionally, the first vehicle may determine an estimated location of the second vehicle based on the particular location of the first vehicle. Furthermore, the first vehicle may compare the estimated location and the location identified in the location information. Moreover, the first vehicle may verify the location of the second vehicle based on comparing the estimated location and the location. In this case, the verified location of the second vehicle may be used to determine whether the second vehicle is within the threshold distance of the first vehicle.

In some implementations described herein, the first vehicle may receive the location information that specifies the location of the second vehicle and may receive additional location information that specifies one or more locations of one or more other vehicles. In these cases, the first vehicle may identify a particular vehicle, of the one or more other vehicles, as a target for content sharing. The particular vehicle may be identified based on: determining that the particular vehicle is within a threshold distance of the first vehicle, or receiving vehicle selection data associated with a user selection of the particular vehicle. In some implementations, such as when the particular vehicle is identified based on receiving the vehicle selection data, the first vehicle may receive the vehicle selection data based on a user interaction with an interface (e.g., the interface described in connection with block 450). The user interaction may be indicative of a user selecting the particular vehicle from a vehicle roadmap that depicts the one or more other vehicles.

As further shown in FIG. 4, process 400 may include establishing, based on determining that the second vehicle is within the threshold distance of the first vehicle, a peer-to-peer (P2P) connection with the second vehicle (block 430). For example, the one or more devices associated with the first vehicle (e.g., the telematics unit of the first vehicle, the UE within the first vehicle, and/or the like) may establish, based on determining that the second vehicle is within the threshold distance of the first vehicle, a peer-to-peer (P2P) connection with the second vehicle, as described above. In some implementations, the first vehicle may establish, as the P2P connection, a cellular vehicle-to-X (C-V2X) connection with the second vehicle.

As further shown in FIG. 4, process 400 may include receiving, from one or more devices associated with the second vehicle and by using the P2P connection, content that has been captured by a camera component associated with the second vehicle (block 440). For example, the one or more devices associated with first vehicle first vehicle (e.g., the telematics unit of the first vehicle, the UE within the first vehicle, and/or the like) may receive, from one or more devices associated with the second vehicle and by using the P2P connection, content that has been captured by a camera component associated with the second vehicle, as described above.

In some implementations, the first vehicle may receive content that has been captured by a camera component associated with the second vehicle. In some implementations described above, when receiving the location information that specifies the location of the second vehicle, the first vehicle may receive the additional location information that specifies the one or more locations of the one or more other vehicles. In these cases, the first vehicle may receive content that has been captured by at least one of: the camera component associated with the second vehicle, or one or more other camera components associated with at least one of the one or more other vehicles.

As further shown in FIG. 4, process 400 may include causing an interface associated with the first vehicle to display the content (block 450). For example, the one or more devices associated with first vehicle (e.g., the telematics unit of the first vehicle, the UE within the first vehicle, and/or the like) may cause an interface associated with the first vehicle to display the content, as described above.

In some implementations, the interface may include at least one of: an interface of a mobile device within the first vehicle, an interface of a heads up display (HUD) of the first vehicle, an interface of a dashboard of the first vehicle, an interface of a navigation system of the first vehicle, or an interface of an infotainment system of the first vehicle. In some implementations, the content displayed via the interface may depict at least an area of a road from a perspective of the second vehicle. In some implementations, the content displayed may include content that would not otherwise be visible to a driver of the first vehicle (e.g., without the driver having to reposition the first vehicle, which might cause a safety issue).

In some implementations, the first vehicle may determine that the second vehicle is no longer within the threshold distance of the first vehicle. In this case, the first vehicle may terminate the P2P connection based on determining that the second vehicle is no longer within the threshold distance of the first vehicle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by one or more devices associated with a first vehicle, location information that specifies a location of a second vehicle;
   determining, by the one or more devices and based on the location information, that the second vehicle is within a threshold distance of the first vehicle;
   establishing, by the one or more devices and based on determining that the second vehicle is within the threshold distance of the first vehicle, a peer-to-peer (P2P) connection with the second vehicle;
   receiving, by the one or more devices, from one or more other devices associated with the second vehicle, and by using the P2P connection, content that has been captured by a camera component associated with the second vehicle;
   causing, by the one or more devices, an interface associated with the first vehicle to display the content;
   terminating, by the one or more devices, the P2P connection based on the second vehicle no longer being within the threshold distance of the first vehicle; and
   causing, by the one or more devices, the camera component associated with the second vehicle to stop capturing the content based on terminating the P2P connection.

2. The method of claim 1, wherein the content displayed via the interface depicts at least an area of a road from a perspective of the second vehicle.

3. The method of claim 1, wherein determining that the second vehicle is within the threshold distance of the first vehicle comprises:
   determining that the second vehicle is within the threshold distance of the first vehicle using a telematics unit that is configured with real-time kinetic (RTK) location tracking technology.

4. The method of claim 1, wherein the location of the second vehicle is a first real-time kinematic (RTK) location;
   wherein determining that the second vehicle is within the threshold distance of the first vehicle comprises:
      determining a second RTK location for the first vehicle,
      comparing a difference between the first RTK location and the second RTK location with the threshold distance, and
      determining that the second vehicle is within the threshold distance of the first vehicle based on comparing the difference between the first RTK location and the second RTK location with the threshold distance.

5. The method of claim 1, further comprising:
determining a particular location of the first vehicle;
determining an estimated location of the second vehicle based on the particular location of the first vehicle;
comparing the estimated location and the location identified in the location information; and
verifying the location of the second vehicle based on comparing the estimated location and the location,
wherein a verified location of the second vehicle is to be used to determine whether the second vehicle is within the threshold distance of the first vehicle.

6. The method of claim 1, wherein receiving the location information comprises:
receiving the location information as part of a broadcast from a particular device associated with the second vehicle,
wherein the broadcast also provides the first vehicle with an identifier of the second vehicle; and
wherein establishing the P2P connection comprises:
establishing the P2P connection using the identifier of the second vehicle.

7. The method of claim 1, wherein establishing the P2P connection comprises:
establishing, as the P2P connection, a cellular vehicle-to-X (C-V2X) connection with the second vehicle.

8. One or more devices associated with a first vehicle, comprising:
one or more memories; and
one or more processors, operatively coupled to the one or more memories, to:
receive location information that specifies one or more locations of one or more other vehicles,
wherein the location information is received from one or more devices associated with the one or more other vehicles;
determine, based on the location information, that a second vehicle, of the one or more other vehicles, is within a threshold distance of the first vehicle;
establish, based on determining that the second vehicle is within the threshold distance of the first vehicle, a peer-to-peer (P2P) connection with the second vehicle;
receive, from a particular device associated with the second vehicle and by using the P2P connection, content that has been captured by at least one of:
a camera component associated with the second vehicle, or
one or more other camera components associated with at least one of the one or more other vehicles;
cause an interface associated with the first vehicle to display the content;
terminate the P2P connection based on the second vehicle no longer being within the threshold distance of the first vehicle; and
cause the particular device associated with the second vehicle to stop capturing the content based on terminating the P2P connection.

9. The one or more devices of claim 8, wherein the content displayed via the interface depicts at least an area of a road from a perspective of the second vehicle.

10. The one or more devices of claim 8, wherein the location of the second vehicle is a first location;
wherein the one or more processors, when determining that the second vehicle is within the threshold distance of the first vehicle, are to:
determine a second location for the first vehicle,
compare a difference between the first location and the second location with the threshold distance, and
determine that the second vehicle is within the threshold distance of the first vehicle based on a result of comparing the difference between the first location and the second location with the threshold distance.

11. The one or more devices of claim 8, wherein the one or more processors, when determining that the second vehicle is within the threshold distance of the first vehicle, are to:
determine that the second vehicle is within the threshold distance of the first vehicle using a telematics unit that is configured with real-time kinetic (RTK) location tracking technology.

12. The one or more devices of claim 8, wherein the interface is at least one of:
an interface of a mobile device associated with the first vehicle,
an interface of a heads up display (HUD) of the first vehicle,
an interface of a dashboard of the first vehicle,
an interface of a navigation system of the first vehicle, or
an interface of an infotainment system of the first vehicle.

13. The one or more devices of claim 8, wherein the one or more processors, when establishing the P2P connection, are to:
establish, as the P2P connection, a cellular vehicle-to-X (C-V2X) connection with the second vehicle.

14. The one or more devices of claim 8, wherein the one or more processors are further to:
cause the particular device associated with the second vehicle to be configured to capture the content based on receiving then indication that the P2P connection was established.

15. A non-transitory computer-readable medium storing instructions, the instructions comprising:
one or more instructions that, when executed by one or more processors of one or more devices associated with a vehicle, cause the one or more processors to:
receive location information that specifies one or more locations of one or more other vehicles;
identify a particular vehicle, of the one or more other vehicles, as a target for content sharing,
wherein the particular vehicle is identified based on:
the one or more processors determining that the particular vehicle is within a threshold distance of the vehicle, or
the one or more processors receiving vehicle selection data associated with a user selection of the particular vehicle;
establish, based on identifying the particular vehicle as the target for engaging in content sharing, a peer-to-peer (P2P) connection with the particular vehicle;
receive, from a particular device associated with the particular vehicle and by using the P2P connection, content that has been captured by a camera component associated with the particular vehicle;
cause an interface associated with the vehicle to display the content;
terminate the P2P connection based on the particular vehicle no longer being within the threshold distance of the vehicle; and cause the particular device associated with the particular vehicle to stop capturing the content based on terminating the P2P connection.

16. The non-transitory computer-readable medium of claim 15, wherein the content displayed via the interface depicts at least an area of a road from a perspective of the particular vehicle.

17. The non-transitory computer-readable medium of claim 15, wherein the one or more locations of the one or more vehicles include a first real-time kinematic (RTK) location of the particular vehicle;
wherein the one or more instructions, that cause the one or more processors to identify the particular vehicle, cause the one or more processors to:
receive the vehicle selection data based on a user interaction with the interface,
wherein the user interaction is indicative of a user selecting the particular vehicle from a vehicle roadmap that depicts the one or more other vehicles.

18. The non-transitory computer-readable medium of claim 15, wherein the one or more instructions, that cause the one or more processors to identify the particular vehicle, cause the one or more processors to:
identify the particular vehicle based on using a telematics unit to determine that the particular vehicle is within the threshold distance of the vehicle,
wherein the telematics unit is configured with real-time kinetic (RTK) location tracking technology.

19. The non-transitory computer-readable medium of claim 15, wherein the one or more instructions, that cause the one or more processors to establish the P2P connection, cause the one or more processors to:
establish, as the P2P connection, a cellular vehicle-to-X (C-V2X) connection with the particular vehicle.

20. The non-transitory computer-readable medium of claim 15, wherein the one or more instructions, when executed by the one or more processors, further cause the one or more processors to:
receive, from the particular vehicle and by using the P2P connection, additional content that has been captured by one or more other camera components associated with at least one of the one or more other vehicles; and
wherein the one or more instructions, that cause the one or more processors to display the content, cause the one or more processors to:
display the content and the additional content.

* * * * *